May 30, 1950
R. HART
2,509,496
MEANS FOR LANDING AIRCRAFT AND
OTHER OBJECTS BY PARACHUTE
Filed Oct. 11, 1945
4 Sheets-Sheet 3
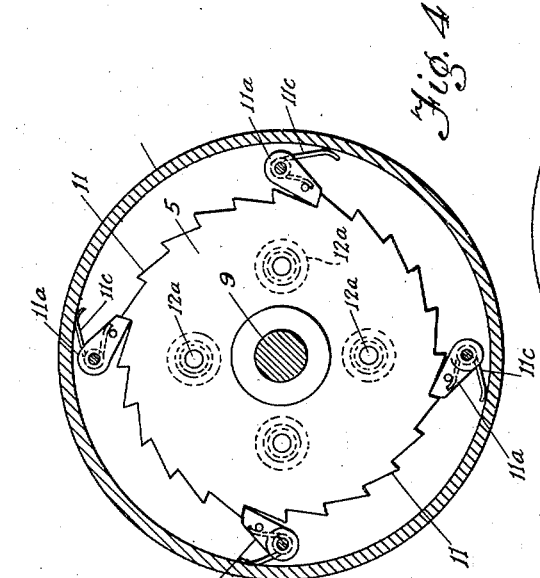
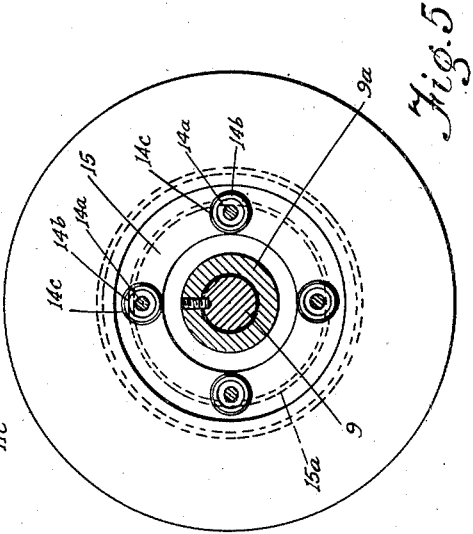
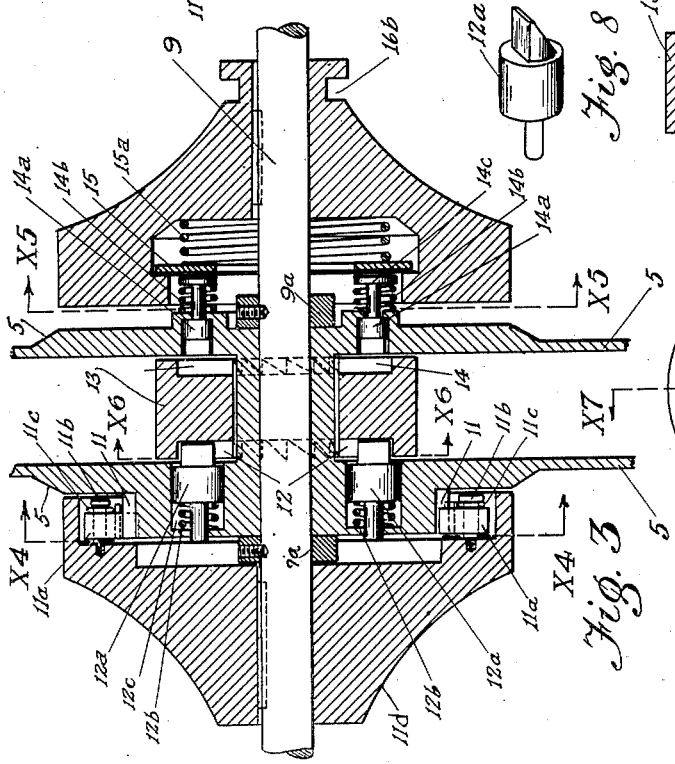
INVENTOR.
Russell Hart May 30, 1950
R. HART
2,509,496
MEANS FOR LANDING AIRCRAFT AND
OTHER OBJECTS BY PARACHUTE
Filed Oct. 11, 1945
4 Sheets-Sheet 4
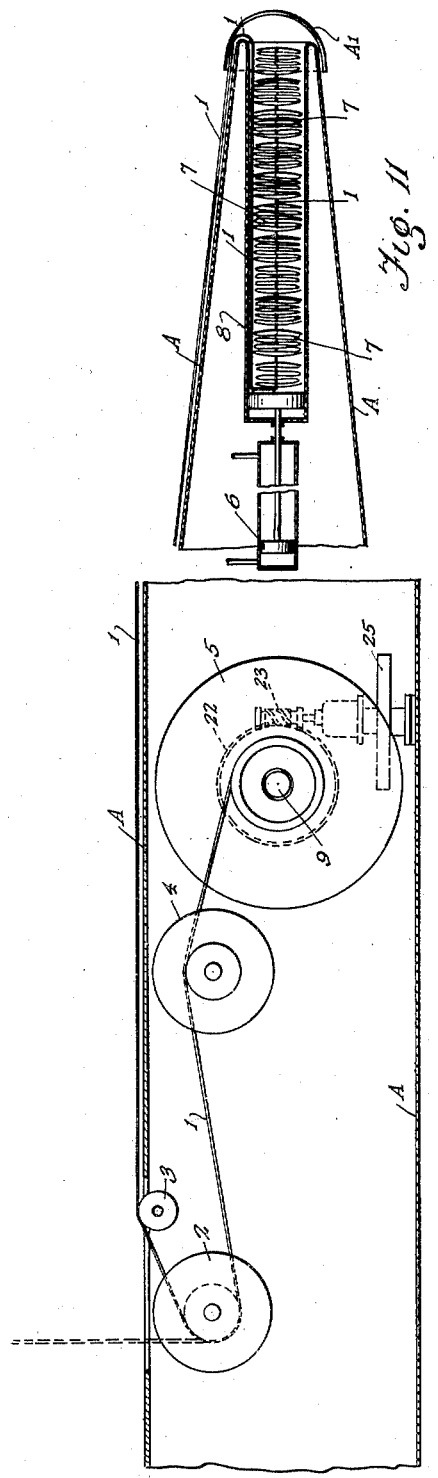
INVENTOR.
Russell Hart Patented May 30, 1950

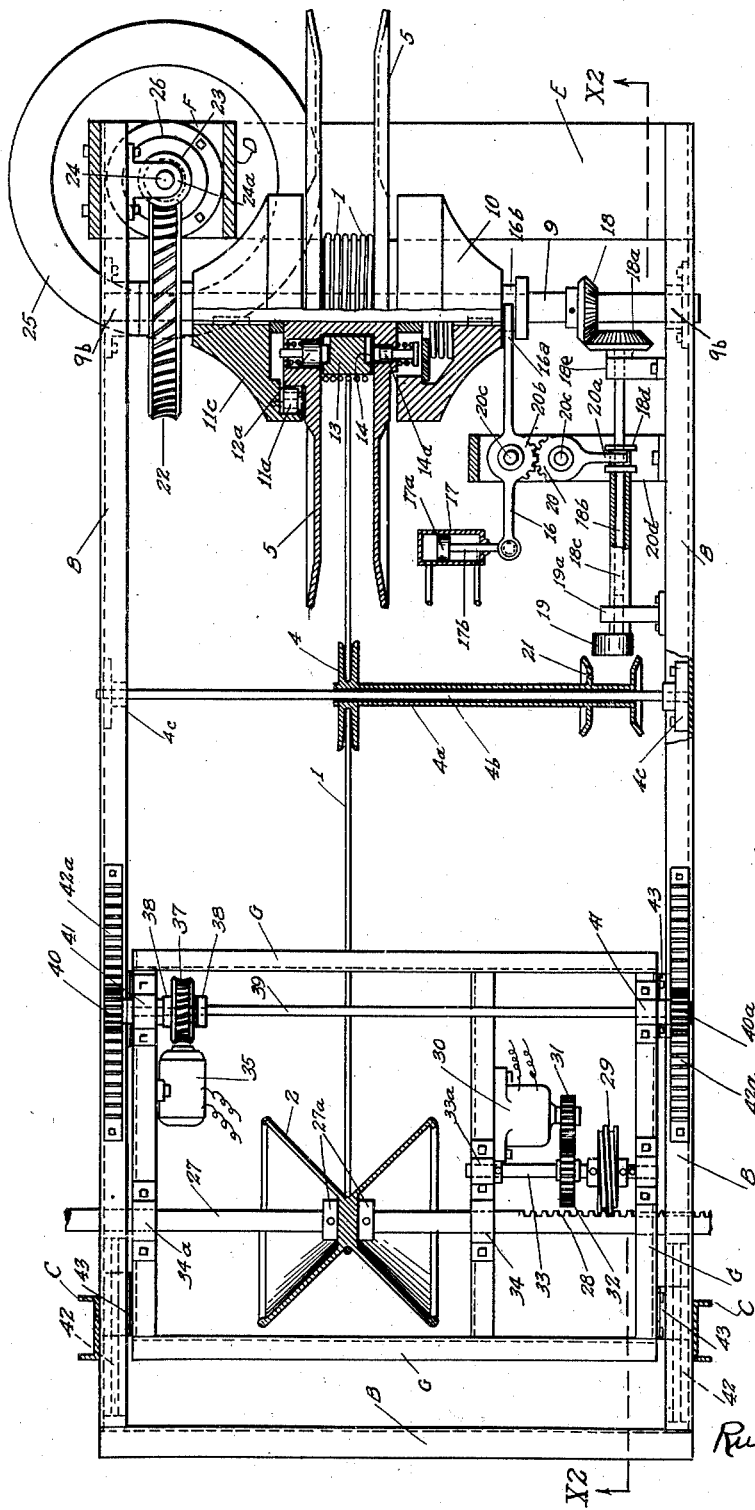

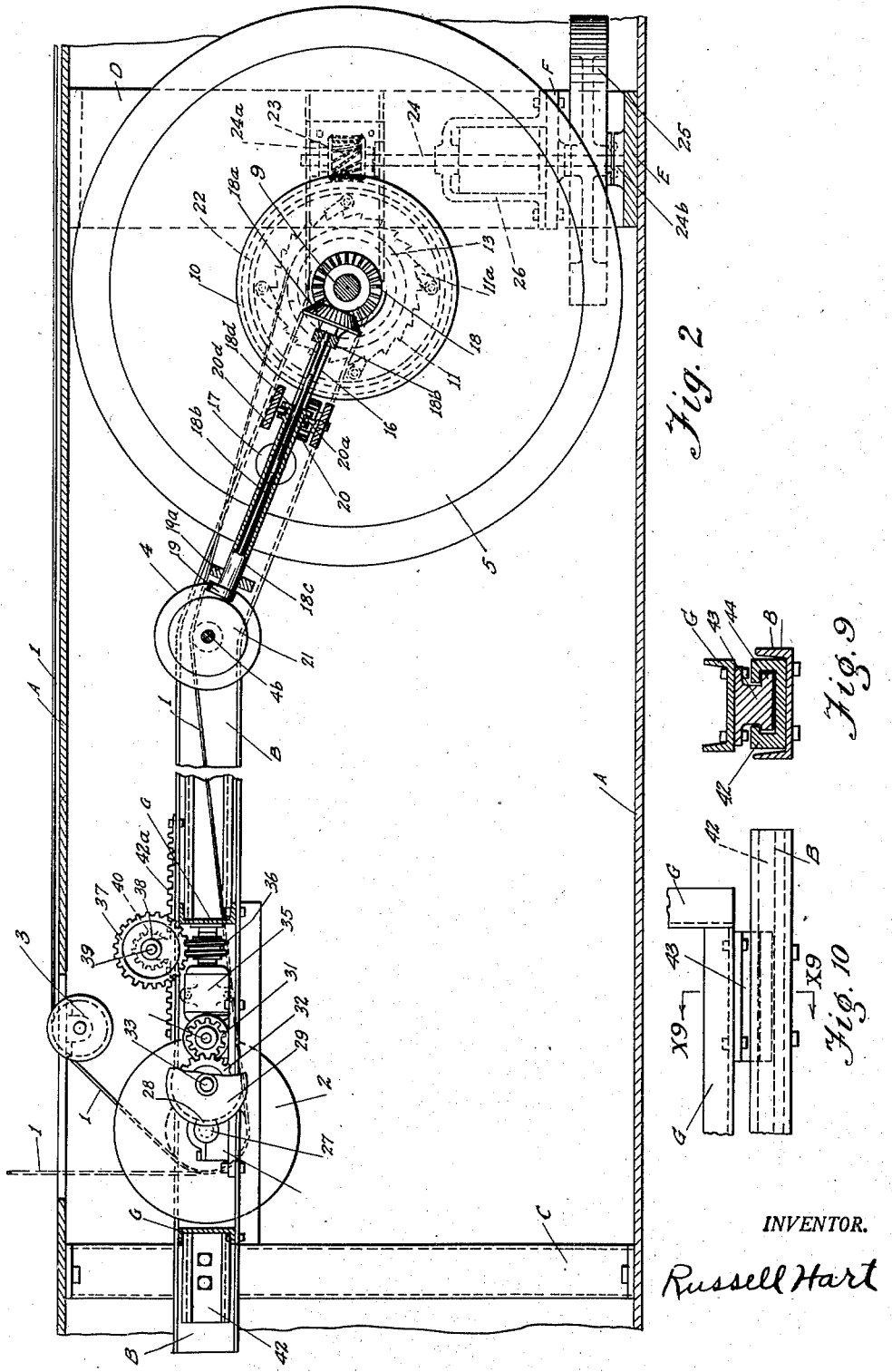

2,509,496

UNITED STATES PATENT OFFICE 2,509,496

MEANS FOR LANDING AIRCRAFT AND OTHER OBJECTS BY PARACHUTE

Russell Hart, Los Angeles, Calif.

Application October 11, 1945, Serial No. 621,673

13 Claims. (Cl. 244—138)

My invention relates to a method and means for landing aircraft and other equipment by parachute. The more important objects are; first, to provide a method and means to safely land an airplane or other heavy object by parachute; second, to reduce the downward velocity of the airplane or object to a low value immediately before impact with the earth or water; third, to absorb and store as mechanical inertia a portion of the energy generated by the parachute opening at high velocity and then using this intertia energy to ease the impact with the earth by rapidly pulling down on the parachute suspension rope; fourth, to relieve the strain on the parachute system when opened at high velocity; fifth, to distribute the shock of opening by arranging a series of parachutes having open tops in tandem; sixth, to reduce the tendency of the parachute system to oscillate; and seventh, to shift the suspension point on airplane so that it will stay reasonably level while being lowered by parachute.

Additional objects and advantages of my invention will appear hereinafter, and while I show herewith and will describe a form of construction to accomplish my objects, I desire it to be understood that I do not limit myself to such form, since various changes and adaptations may be made therein without departing from the spirit of the invention as hereinafter claimed.

This invention will permit an airplane to make an emergency landing by parachute in comparative safety on rough land or water with its engines inoperative. With the engines operating it will be possible to maneuver the airplane to a desirable landing spot while descending by parachute and then reduce he shock of landing to near zero. It will make possible and desirable ordinary landings by parachute and hence will eliminate the necessity for heavy landing gear as now used.

Airplanes are now designed with wings large enough to generally permit a landing speed of under 100 miles per hour because the landing gear, tires, hull, runway, etc. and the ability of the pilot will not permit safe contact with the ground or water at much higher speed. At the top speed of the airplane these large wings are not needed for lift and consume a large amount of power by their drag.

This invention for landing airplanes by parachute will make large thick wings unnecessary and allow airplanes to be designed with small thin wings and hence high minimum flying speed. This minimum flying speed can be nearly as high as it is possible to design a parachute and gear to open safely. The parachute and gear shown in this application can be constructed of known materials and so operated as to allow safe opening at flying speeds of about 400 miles per hour at 10,000 feet or above 600 miles per hour at 30,000 feet altitude.

This invention contemplates the launching of airplanes having small thin wings and hence high minimum flying speed by raising them up into the air a few thousand feet by captive or dirigible balloon and then releasing them with their engines running and allow gravity to aid in their acceleration to minimum flying speed. Rockets are another possibility.

Airplanes propelled by jet engines must fly very fast and at high altitude to be economical. This invention makes possible for them to be designed with small thin wings and high minimum flying speed and yet provide for safe landing by parachute at near zero velocity.

This apparatus can be mounted in the airplane many different ways to meet the requirements of designers. Any scheme of mounting giving the required strength, rigidity and alignment will be suitable. In the drawings I show the component parts in a workable sequence. The various essential parts can be of any suitable design.

In the accompanying drawings:

Figure 1 is a plan of the landing mechanism installed in airplane.

Figure 2 is a sectional elevation on line X2—X2 of Figure 1.

Figure 3 is a section through the winding reel hub showing ratchet systems.

Figure 4 is a section on line X4—X4 of Figure 3.

Figure 5 is a section on line X5—X5 of Figure 3.

Figure 6 is a view along X6—X6 of Figure 3 showing center of winding reel to which the parachute suspension rope is attached.

Figure 7 is a section on line X7—X7 of Figure 6 showing opposing ratchet teeth.

Figure 8 is a view of a typical ratchet pawl.

Figure 9 is a section on line X9—X9 of Figure 10.

Figure 10 is a fragmentary plan view of a supporting device whereby a subframe is slidably supported on the main frame of the apparatus.

Figure 11 is a view of the folded tandem parachutes stored in a tube at the rear end of fuselage.

Figure 12 is a view of the opened tandem parachutes.

Figure 13 is a view showing a possible arrangement of the parachute suspension rope, winding reel, guide pulleys and suspension pulley.

The letter A indicates the fuselage of airplane; B is a frame to support various parts of this apparatus and is fastened to the fuselage by several supports C; D is a support for shaft 24, motor 26, etc.; E supports the end of shaft 24 and thrust bearing 24b; F supports motor 26; G is a subframe slidably mounted on main frame B and supports and positions suspension pulley 2 and shaft 27, etc.

The parachute 7 is carried in a tube at the rear end of fuselage A and can be expelled by the pressure of piston 6. This parachute can be a single large canopy or a group of canopies hitched in parallel to suspension rope 1. However I prefer a number of open top parachutes hitched to the suspension rope as illustrated because the shock of opening a high speed is less and better distributed and the tendency to oscillate is less. Also the jet action between the open top parachutes in tandem tends to give slower descent per unit of area and weight.

The suspension rope 1, which has considerable length, extends from the bottom of parachute 7 through the inside of tube 8 to the rear of fuselage A and then forward on the top outside of fuselage to and over idler pulley 3, under suspension pulley 2, over winding pulley 4, its end fastened solidly to ring 13 and is then evenly wound on reel 5.

Reel 5 is supported by and can rotate on shaft 9 which can rotate in bearings 9b attached to frame B. Bearings 9b are designed to take the end thrust caused by spiral gear 22. Reel 5 is positioned on shaft 9 by collars 9a. Reel hub ring 13 can rotate inside reel 5 and is controlled by opposing ratchets 12 and 14. Ratchet 12 and pawls 12a are set in a direction which will lock ring 13 to reel 5 when the suspension rope 1 is unwound from reel by the pull of the opened parachute. Ratchet 12 and pawls 12a will permit the reel 5 to rotate free from ring 13 when all the parachute suspension rope is unwound. This prevents the momentum of reel 5 starting to rewind the suspension rope and possibly cause a dangerous snap strain on the rope. Pawls 12a are held against ratchet 12 by springs 12c.

When the parachute suspension rope is being unwound from reel 5 by the pull of opened parachute, ratchet 11 and pawls 11a lock the reel to collar 11d which is keyed solid to shaft 9 and causes the shaft to be rotated by the reel. However ratchet 11 and pawls 11a will not cause shaft 9 to collar 11d to rotate reel 5. 11c are springs to keep pawls 11a in contact with ratchet 11.

Normally the reel 5 with the suspension rope wound on it is held stationary by some form of brake which is not shown in the drawings. When the parachute is released this brake could be automatically released.

Keyed on shaft 9 is a large reversible spiral gear 22 which meshes with the smaller reversible gear 23 keyed on shaft 24. Inertia wheel 25 is keyed on shaft 24. Built on shaft 24 is the armature of a series or universal type electric motor 26. Shaft 24 is supported by and rotates in bearings 24a and 24b which are designed to take the reversible end thrust caused by spiral gear 23.

When the pilot decides to make a landing by parachute, he will put pressure on piston 6 which will push the folded parachute 7 through tube 8, release cover A1 and allow the parachute to be expelled and opened. The opened parachute will then exert a powerful pull on suspension rope 1 which will cause reel 5 to rotate at an increasing rate as the rope is unwound. Rotation of reel 5 will cause collar 11d and shaft 9 to be rotated by ratchet 11 and pawls 11a. Rotation of shaft 9 causes gears 22 and 23 to rotate shaft 24 and attached inertia wheel 25 at a high speed. Thus the opening of the parachute is made to store energy in inertia wheel 25. This also acts to absorb the opening shock of the parachute and eases the strain on suspension rope 1. To make the opening shock still less, I mount on shaft 24 a motor or other source of power 26 which can be used by the pilot to give shafts 24 and 9 any speed of rotation desired before he releases the parachute. This motor or source of power 26 can also be used advantageously to store energy in the inertia wheel while making descent.

The airplane will now begin losing forward speed and descend in a parabolic curve until the forward momentum is spent and suspension rope 1 has assumed a nearly vertical position. The airplane will descend earthward at a velocity determined by the size and design of parachute and weight of airplane, etc. This velocity can be 30 feet per second more or less. The engine and propeller can be used during the descent to guide airplane to a desired landing spot.

The pilot looks downward and when about 100 feet above the ground, he puts pressure through pipe 17c into cylinder 17 and on piston 17a. This causes connecting rod 17b to push clutch lever arm 16 and through pivot 20c to move clutch yoke 16a sliding in channel 16b and clutch 10 towards reel 5 to engage it. The clutch 10 is slidably splined on shaft 9 and when engaging the reel 5 will allow the shaft 9 to rotate reel to wind in the suspension rope 1. As the clutch is about to engage the reel, pressure ring 15 makes contact with pawl heads 14c and forces pawls 14a, against the tension of springs 14b, into contact with ratchet teeth 14 on the side of ring 13. Pressure ring 15 is cushioned by springs 15a. The ratchet teeth 14 on ring 13 and pawls 14a are set in such a direction that when the shaft 9 and clutch 10 engage and rotate reel 5, the ring 13 and reel 5 are locked together and revolve as a unit. Suspension rope 1 is solidly attached to ring 13. Shaft 9 is being rotated by the inertia of wheel 25 and or motor 26 and when clutch 10 engages reel 5 it will rapidly wind in the suspension rope 1. This rapidly increases the downward velocity of parachute and greatly increases its drag or lift which absorbs the downward momentum of airplane and with skill in the use of clutch 10, contact with the ground can be made at near zero velocity.

The suspension rope 1 when being rapidly wound in on reel 5 is under great stress and it is desirable that it be wound evenly in layers. This is accomplished by winding guide pulley 4. This winding pulley and also cam guide 21 are solidly mounted on sleeve 4a which is free to rotate and slide on shaft 4b under the influence of cam 19. Shaft 4b is fastened to frame B by fittings 4c. Cam 19 is solidly mounted on sliding sleeve 18c which is rotated by and can slide on shaft 18b driven by gears 18 and 18a from shaft 9. Sleeve 18c is supported by bearing 19a through which it can slide and also by shaft 18b. Shaft 18b is supported by and rotates in bearing 18e. The ratio of gears 18 to 18a and the profile of cam 19 is such as to move winding guide pulley 4 on shaft 4b a distance equal to the diameter of suspension rope 1 for each revolution of shaft 9 and reel 5. The throw of cam 19 is equal to the width of reel 5.

It is undesirable to have cam 19 engaging cam guide 21 while the parachute is rapidly unwinding the suspension rope from the reel and hence I interlock the clutch lever arm 16 through pivots 20c, teeth 20 and 20b, and yoke 20a riding in collar 18d on sleeve 18c in such a way as to slide the sleeve 18c and remove the cam 19 out of reach of cam guide 21 when the clutch 10 is disengaged from reel 5 and to move cam 19 into engagement with cam guide 21 when the clutch engages the reel and starts winding the suspension rope in.

The suspension rope 1 supports the airplane while descending by pulling up on suspension pulley 2. This pulley is actually the point by which the airplane is suspended and it is preferably placed a short distance above the center of gravity of airplane. It is desirable that this pulley have wide guide flanges, as illustrated, to catch and position the suspension rope even if the airplane is considerably heavy on one wing.

Pulley 2 rotates on and is supported and positioned by shaft 27. It is held in place on shaft 27 by collars 27a. Shaft 27 is attached to subframe G by and can slide endwise in mountings 34 and 34a. Suspension pulley 2 and supporting shaft 27 can be shifted in frame G toward either side by energizing reversible motor 30 fastened to frame G and which turns reducing gears 31 and 32 and worm gear 29 which engages the teeth 28 cut on shaft 27. It may be desirable to shift pulley 2 while descending to keep the wings reasonably level.

Subframe G has mounted on and attached to it reversible motor 35, worm gears 36 and 37, shaft 39, bearings 41, and spur gears 40 and 40a. It is slidably mounted on and attached to frame B by means of gibs 42, 43 and 44. Subframe G can be shifted lengthwise of frame B by energizing reversible motor 35 which turns worm gears 36 and 37, shaft 39 and spur gears 40 and 40a which engage teeth on gear rack 42a attached to frame B. It may be desirable to shift subframe G and hence suspension pulley 2 a short distance toward the front or rear of airplane so that the fuselage will make contact with the earth or water reasonably level.

Reel 5 is preferably designed narrow and deep to give a more rapidly changing diameter of suspension rope coil. This gives the parachute when opening a greater leverage to start inertia wheel 25. It also compensates for the decreasing speed of inertia wheel when winding in the suspension rope.

Inertia wheel 25 should be made of the strongest possible material, perfectly balanced, and rotate in bearings having as little friction as possible. Its speed must be very high to store the required energy and not exceed the permissible weight. Inertia wheel can be mounted to rotate in any desired plane and its shaft 24 can be connected to shaft 9 by any type of reversible gearing or belting desired. Shaft 24 can be made slightly flexible to compensate for any minute unbalance of inertia wheel.

The inertia wheel seems to be the most desirable and reliable source of energy to furnish the required several hundred horsepower for a few seconds. However any source of power can be used to rotate shaft 9 to reel in the suspension rope.

Electric motor 26 is preferably a series type having high starting torque and capable of high speed. A turbine operated by compressed gas could be used instead of or with electric motor 26.

Suspension rope 1 should have a length of at least 200 feet and be made of a strong elastic substance such as silk or nylon.

It is desirable that each of the tandem canopies illustrated have a central opening adapted to pass upward in a central jet substantially all the air intercepted by its under side. I illustrate in Fig. 12 the preferred form of open center canopy. An essential feature of this open center canopy is that, when opened, its inner section curves concavely upward and its outer section curves concavely downward. This feature reduces the air turbulence above and below the inner section of canopy and hence increases its stability and lift. This type of canopy can, in effect, be regarded as a circular wing. The jet action of the air escaping upward through the said central opening of canopy will act to draw more air into the open center canopies above it and hence increase their lift.

This method and apparatus can be used to advantage in airplane landing operations where the parachute is used as a brake to stop airplane on a slippery or limited landing field. It will give needed increased velocity and drag to the parachute as the airplane slows down to a stop.

I claim:

1. Apparatus to land aircraft by parachute comprising; a suspension pulley adjustably mounted on the aircraft near the aircraft's center of gravity; a reel mounted on the aircraft; a source of power adapted to rotate said reel; a parachute assembly; a length of suspension rope having one of its ends attached to the parachute assembly, then passing under said suspension pulley and having its other end attached to said reel and adapted to be wound thereon.

2. Apparatus to land aircraft by parachute comprising; a suspension pulley mounted on the aircraft near the aircraft's center of gravity; a reel mounted on the aircraft; a source of power adapted to rotate said reel; a parachute assembly; a length of suspension rope having one of its ends attached to the parachute assembly, then passing under said suspension pulley and having its other end attached to said reel and adapted to be wound thereon; a winding guide pulley adapted to engage and guide the suspension rope while it is being wound on the reel, said winding guide pulley adapted to be guided by the rotation of said reel.

3. Apparatus to land aircraft by parachute comprising; a suspension pulley mounted on the aircraft near the aircraft's center of gravity; a reel supporting shaft mounted on and free to rotate in bearings attached to the aircraft; a reel mounted on said reel supporting shaft and adapted to rotate freely thereon; a clutch mounted on and slidably keyed to said reel supporting shaft and adapted to engage and rotate said reel; a source of power adapted to rotate the reel supporting shaft; a parachute assembly; a length of suspension rope having one of its ends attached to the parachute assembly, then passing under said suspension pulley and having its other end attached to said reel and adapted to be wound thereon; a winding guide pulley adapted to engage and guide the suspension rope, said winding guide pulley adapted to be guided by the rotation of said reel supporting shaft while the clutch is rotating the reel and to rotate free and unguided while the clutch is disengaged from the reel.

4. Apparatus to land aircraft by parachute comprising; a suspension shaft mounted transverse of aircraft and near the aircraft's center of gravity, said suspension shaft being mounted in bearings attached to the aircraft and adapted to be laterally adjustable in said bearings; a suspension pulley mounted on said suspension shaft and adapted to rotate freely thereon, said suspension pulley being positioned on its shaft by collars attached to the shaft; a reel mounted on the aircraft; a source of power adapted to rotate said reel; a parachute assembly; a length of suspension rope which has one of its ends attached to the parachute assembly, then passing under the suspension pulley and having its other end attached to said reel and adapted to be wound thereon.

5. Apparatus to land aircraft by parachute comprising; a support base gibbed to the aircraft near the aircraft's center of gravity and adapted to be longitudinally adjustable in said gibs; a suspension shaft mounted on said support base transverse of the aircraft, said suspension shaft being mounted in bearings attached to said support base and adapted to be laterally adjustable in said bearings; a suspension pulley mounted on said suspension shaft and adapted to rotate freely thereon, said pulley being positioned on said shaft by collars attached to the shaft; a reel mounted in the aircraft; a source of power adapted to rotate said reel; a parachute assembly; a length of suspension rope which has one of its ends attached to the parachute assembly, then passing under said suspension pulley and having its other end attached to said reel and adapted to be wound thereon.

6. Apparatus to land aircraft by parachute comprising; a parachute assembly; a reel mounted on the aircraft; a reel hub ring mounted on the hub of said reel and adapted to rotate freely thereon; a length of suspension rope having one of its ends attached to the parachute assembly and its other end solidly attached to said reel hub ring; a clutch adapted to engage and rotate the reel; a set of ratchets mounted on the reel and adapted to engage ratchet teeth on said reel hub ring, said ratchets adapted to be pushed into the engaging position by the movement of the clutch towards the reel and adapted to lock the reel hub ring and the reel together while the clutch is rotating the reel; and a source of power adapted to rotate the clutch.

7. Apparatus to land aircraft by parachute comprising; a reel supporting shaft mounted on and free to turn in bearings attached to the aircraft; a reel mounted on said shaft and free to rotate thereon; a clutch mounted on and slidably keyed to the reel supporting shaft and adapted to engage and rotate the reel; a source of power adapted to rotate the reel supporting shaft; a reel hub ring mounted on the hub of said reel and free to rotate thereon; a parachute assembly; a length of suspension rope having one of its ends attached to the parachute assembly and its other end attached to said reel hub ring; a ratchet collar mounted on and solidly keyed to said reel supporting shaft; a set of ratchets mounted on said ratchet collar and adapted to engage ratchet teeth on the reel while the suspension rope is unwinding from the reel; a set of ratchets mounted on the reel and adapted to engage teeth on said reel hub ring, said ratchets adapted to be pushed into the engaging position by the movement of said clutch towards the reel.

8. Apparatus to land aircraft by parachute comprising; a reel supporting shaft mounted on and free to rotate in bearings attached to the aircraft; a reel mounted on said shaft and free to rotate thereon; a clutch mounted on and slidably keyed to the reel supporting shaft and adapted to engage and rotate the reel; a source of power adapted to rotate the reel supporting shaft; a reel hub ring mounted on the hub of said reel and free to rotate thereon; a parachute assembly; a length of suspension rope having one of its ends attached to the parachute assembly and its other end solidly attached to said reel hub ring; a set of ratchets mounted on the reel and adapted to engage ratchet teeth on the reel hub ring while the suspension rope is unwinding from the reel; a ratchet collar mounted on and solidly keyed to said reel supporting shaft; a set of ratchets mounted on said ratchet collar and adapted to engage ratchet teeth on the reel while the suspension rope is unwinding from the reel; a set of ratchets mounted on the reel and adapted to engage teeth on said reel hub ring, said ratchets adapted to be pushed into the engaging position by the movement of said clutch towards the reel.

9. Apparatus to land objects by parachute comprising, a parachute assembly; a length of suspension cable connecting the parachute assembly and object; said parachute assembly consisting of a plurality of open center canopies of practically equal diameter attached to the suspension cable at spaced intervals in tandem, the central opening of each canopy having an area adapted to pass upward in a central jet practically all the air intercepted by its underside; a reel on which to wind the suspension cable; a shaft to support said reel; a clutch splined to shaft and adapted to engage reel and shaft to wind in the suspension cable; and a source of power adapted to rotate said shaft.

10. Apparatus to land objects by parachute comprising, a parachute assembly; a length of suspension cable connecting object to parachute assembly; a reel on which to wind suspension cable; a shaft to support said reel; a collar attached to said shaft which contains engaging means adapted to automatically engage the reel and shaft when the speed of reel exceeds the speed of shaft and adapted to automatically disengage the reel and shaft when the speed of shaft exceeds speed of reel.

11. Apparatus to land objects by parachute comprising, a parachute assembly; a length of suspension cable connecting object to parachute assembly; a reel on which to wind the suspension cable; a shaft to support said reel; a collar attached to said shaft which contains engaging means adapted to automatically engage the reel and shaft when the speed of reel exceeds the speed of shaft and adapted to automatically disengage the reel and shaft when the speed of shaft exceeds speed of reel; a clutch splined to shaft and adapted to engage reel and shaft to wind in the suspension cable; and a source of power adapted to rotate said shaft.

12. Apparatus to land objects by parachute comprising, a parachute assembly; a length of suspension cable connecting object to parachute assembly; a reel on which to wind the suspension cable; a shaft to support said reel; a collar attached to said shaft which contains engaging means adapted to automatically engage the reel and shaft when the speed of reel exceeds speed of shaft and adapted to automatically disengage the reel and shaft when the speed of shaft exceeds speed of reel; an inertia wheel power connected to shaft; and a clutch splined to shaft and adapted to engage reel and shaft to wind in the suspension cable.

13. Apparatus to land objects by parachute comprising, a parachute assembly; a length of suspension cable connecting object to parachute assembly; a reel on which to wind the suspension cable; a shaft to support said reel; a collar attached to said shaft which contains engaging means adapted to automatically engage the reel and shaft when the speed of reel exceeds speed of shaft and adapted to automatically disengage the reel and shaft when the speed of shaft exceeds speed of reel; an inertia wheel power connected to shaft; a clutch splined to shaft and adapted to engage reel and shaft to wind in the suspension cable; and a source of power adapted to rotate said shaft.

RUSSELL HART.

REFERENCES CITED

The following references are of record in the file of this patent:

UNITED STATES PATENTS

| Number | Name | Date |
|---|---|---|
| 2,235,657 | Thornblad | Mar. 18, 1941 |
| 2,403,099 | Lear | July 2, 1946 |

FOREIGN PATENTS

| Number | Country | Date |
|---|---|---|
| 389,007 | Great Britain | Mar. 9, 1933 |
| 516,292 | Great Britain | Dec. 29, 1939 |
| 473,974 | France | Oct. 27, 1914 |
| 851,913 | France | Oct. 16, 1939 |